May 12, 1942.  A. F. GENOVA  2,282,862

REFRIGERATION APPARATUS

Filed March 8, 1938

INVENTOR:
ALBERTO FRANCESCO GENOVA
BY
Haseltine, Lake & Co.
ATTORNEYS.

Patented May 12, 1942

2,282,862

UNITED STATES PATENT OFFICE 2,282,862

REFRIGERATION APPARATUS

Alberto Francesco Genova, Venice, Italy, assignor, by mesne assignments, to Insta-Freeze Corporation, San Francisco, Calif., a corporation of California Application March 8, 1938, Serial No. 194,556
In Italy March 17, 1937

9 Claims. (Cl. 62—114)

This invention relates to an improvement in or modification of the process and apparatus described and claimed in the specification to my prior Patent No. 2,094,354 in which there is described an apparatus in which the substance to be frozen is delivered in uncontrolled quantities into a chamber formed at the upper end of a member rotatably mounted in a fixed chamber and from which it is discharged by centrifugal action through one or more small openings against the inner wall of said fixed vessel.

It has been found that there are certain disadvantages in the apparatus thus briefly referred to; for example, the opening or openings in the chamber of the rotatable vessel are liable to become obstructed owing to impurities in the subtsance introduced; the impossibility of regulating said opening or openings according to the variable density of the substances and the possibility of the substance under certain conditions beginning to freeze while in the chamber of the rotatable vessel before it can be projected through the openings therein.

The object of the present invention is to overcome the objection above referred to and to this end the supply of the substance to be frozen is manually or automatically regulated before it enters the freezing vessel, and said substance is delivered directly on to a helical rotatable member from which it is thrown by centrifugal action against the inner surface of the fixed vessel from which it is detached, conveyed down and discharged into a collecting vessel ready for use by means of said helical rotatable member.

In the accompanying drawing which illustrates a form of apparatus constructed in accordance with this invention—

Figure 4:
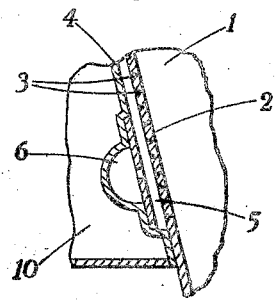

In the drawing, the freezing vessel 1 is of truncated conical formation and is provided with a smooth internal wall 2, the outer surface of said wall being furnished with a plurality of closely arranged circumferential grooves or a continuously arranged spiral groove 3 (Figure 4) extending from the top to the bottom of said wall. The outer grooved wall is surrounded by a further wall 4 disposed parallel with but spaced from said grooved wall to form a second chamber 5, hereinafter referred to as the freezing chamber. The wall 4 is provided with annular chambers 6, 7 and 8 for the purpose hereafter described. The freezing chamber 5 is itself surrounded by a further wall 9 disposed approximately parallel with but spaced apart from the wall 4 to form a chamber 10 which serves to insulate the freezing chamber from the atmosphere.

Coaxially mounted in suitably disposed bearings on the cover 11 of the apparatus is a shaft 12 driven by a small electro-motor not shown, upon which shaft is secured a helical member of conical formation, the peripheral edge of the blade 13 of which is adapted to scrape lightly against the inner wall 2 of the vessel 1. The peripheral edge of the helical blade 13 is provided throughout its length with semi-circular recesses 14 adapted to interrupt the contact between the edge of the helix and the surface of the wall 2.

Figure 1:
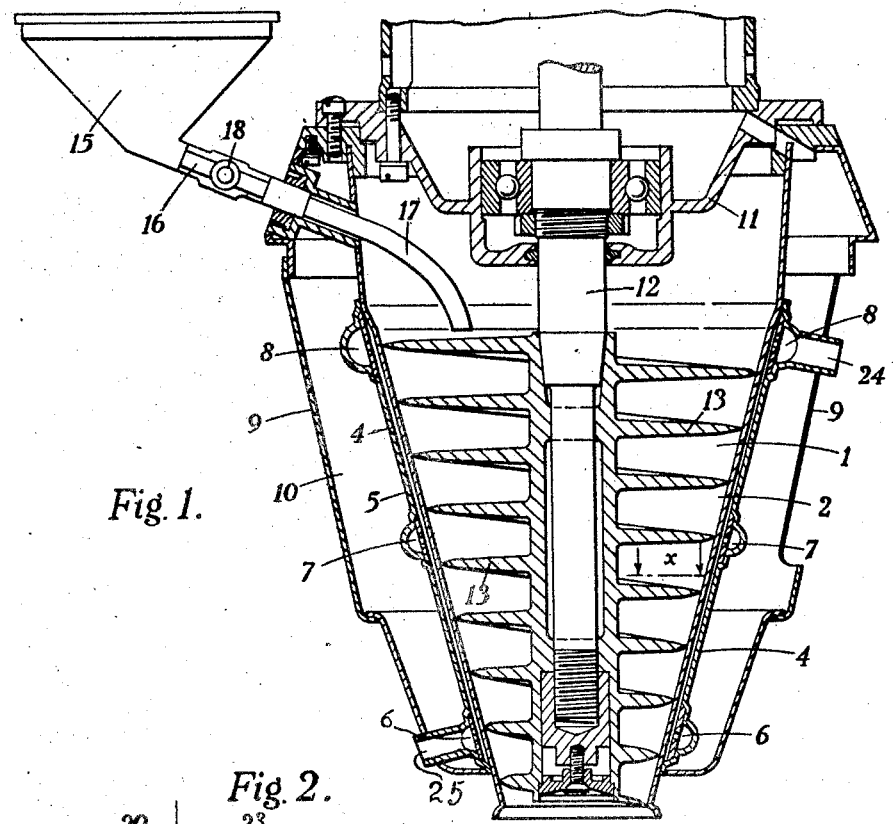
Figure 1 is a vertical section.

The substance to be frozen is introduced into the vessel 1 from a funnel shaped vessel, such as 15, provided with a discharge pipe 16 connected in any convenient manner to the inlet pipe 17, the lower or free end of which is disposed a short distance above the uppermost part of the blade 13. The discharge pipe 16 is provided with means for regulating the flow of the substance from the vessel 15 to the vessel 1 and the means shown in Figure 1 comprises an ordinary spigot cock 18 adapted to be actuated by hand.

Figure 2:
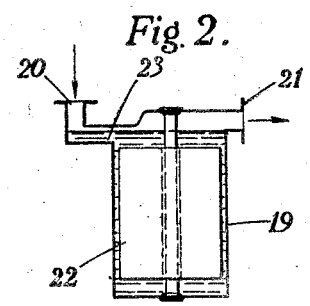
Figure 2 is a diagrammatic representation of a means for automatically controlling the supply of substance to be frozen.
Figure 3:
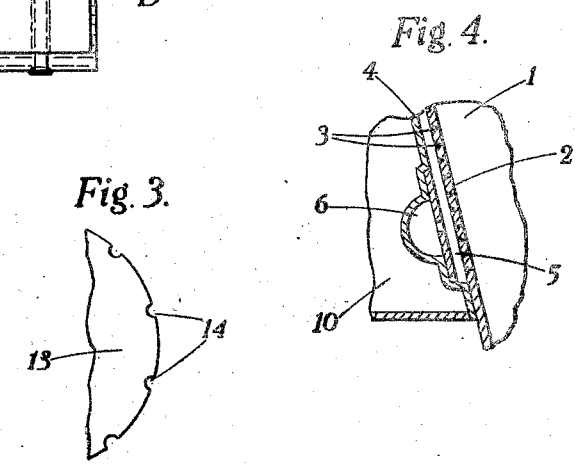
Figure 3 is a fragmentary view in plan on line $x$ Figure 1 of the edge of the blade of the helical member, and, Figure 4 is a fragmentary view in vertical section, drawn to an enlarged scale, of the lower end of the freezing chamber.

If it should be desired to regulate the supply of substance automatically, a device such as that illustrated in Figure 2 may be employed, said device comprising a chamber 19 provided with a connection 20 to which the vessel 15 or discharge pipe 16 is attached and with a connection 21 to which the outer end of the inlet pipe 17 is attached, a float 22 being axially supported in the chamber 19, the position of said float relatively to the passage 23 varying according to the density of the substance passing therethrough.

The operation of the apparatus is as follows:

The motor for supplying the fluid or the like employed for freezing the substance is first switched on and the fluid enters the chamber 5 from one or more inlet ports 25 through the annular chambers 6 and 7 and passes upwardly to the annular chamber 8 from which it passes to the outlet 24. The motor for driving the helical member is now, or simultaneously, switched on and the substance to be frozen is introduced into the vessel 15. As soon as the correct freezing temperature has been reached, which may be indicated in any convenient manner, such as by a lamp and switch device, the cock 18 is opened to the extent desired according to the density of the substance to be frozen. The substance passes through the discharge pipe 16 and cock 18 to the inlet pipe 17 from which it is discharged directly on to the upper surface of the uppermost part of the blade 13 from which it is thrown by centrifugal action on to the wall 2 of the vessel 1 and from which it is scraped and conveyed by the helical member downwardly to the lower end of the chamber 1 from which it is discharged into a glass or other collecting vessel ready for use.

The passage of the freezing fluid through the chamber 5 from inlet port 25 toward outlet port 24 will be retarded by the grooves 3, thereby enabling the freezing action to be as complete as possible, the exchange of heat between the substance to be frozen and the freezing liquid being effected as the two liquids move in opposite directions. This effect of heat exchange will be rendered more efficacious when use is made, as a freezing agent, of a gas which vaporise in the chamber 5 after entering the chambers 6 and 7 in a liquid state and passing out from the chamber 8 in a gaseous state.

Having now particularly described and ascertained the nature of my said invention and in what manner the same is to be performed, I declare that what I claim is:

1. In apparatus for instantaneously producing ice cream and other frozen comestibles, or frozen potable liquids, a freezing vessel having an upper inlet port and a lower outlet port, freezing means for maintaining an invariably uniform low refrigerating temperature in said freezing vessel in order to freeze the materials introduced into the same, a helical member disposed in a position for receiving the material to be frozen directly upon an upper portion thereof and rotatable in the vessel in contact with the inner wall thereof for moving the frozen material to the outlet port, and means for manually regulating the supply of said material to be frozen to the vessel inlet port according to the nature of said material, including a supply pipe and a valve in said pipe regulatable in accordance with the density of the material passing therethrough.

2. In apparatus for instantaneously producing ice cream and other frozen comestibles, or frozen potable liquids, a freezing vessel having an upper inlet port and a lower outlet port, freezing means for maintaining an invariably uniform low refrigerating temperature in said freezing vessel in order to freeze the materials introduced into the same, a helical member disposed in a position for receiving the material to be frozen directly upon an upper portion thereof and rotatable in the vessel in contact with the inner wall thereof for moving the frozen material downwardly to the outlet, and means for regulating the supply of said material to be frozen to the vessel inlet port in accordance with the nature of said material, including a supply pipe, a chamber interposed in said pipe, and a float to regulate the flow of said material supported in said chamber, the displacement of the float varying according to the density of the material passing through the pipe and chamber.

3. In apparatus for instantaneously producing ice cream and other frozen comestibles, or frozen potable liquids, a stationary freezing vessel having an upper inlet port and a lower outlet port, freezing means for maintaining an invariably uniform low refrigerating temperature in said freezing vessel in order to freeze the materials introduced into the same, a helical member rotatable about an upright axis in the vessel in contact with the inner wall thereof, means for delivering the material to be frozen directly to the upper helical surface exteriorly of the central portion of the rotatable helical member so as to be centrifugally projected therefrom directly against the inner surface of the freezing vessel and from which the frozen material is scraped by the helical member and fed downwardly to the outlet port for discharge and use.

4. In apparatus for instantaneously producing ice cream and other frozen comestibles, or frozen potable liquids, a stationary freezing vessel having an upper inlet port and a lower outlet port, freezing means for maintaining an invariably uniform low refrigerating temperature in said freezing vessel in order to freeze the materials introduced into the same, a helical member rotatable about an upright axis in the vessel in contact with the inner wall thereof, means for delivering the material to be frozen directly to the upper helical surface eccentrically of the central portion of the rotatable helical member so as to be centrifugally projected therefrom directly against the inner surface of the freezing vessel and from which the frozen material is scraped by the helical member and fed downwardly to the outlet port for discharge and use and the peripheral edge of the helical member having spaced recess portions therein serving to interrupt the contact of said helical member with the inner surface of said vessel.

5. In apparatus for instantaneously producing ice cream and other frozen comestibles, or frozen potable liquids, a stationary freezing vessel having an upper inlet port and a lower outlet port, a helical member rotatable about an upright axis in the vessel in contact with the inner wall thereof, means for delivering the material to be frozen directly by gravity to the upper helical surface eccentrically of the central portion of the rotatable helical member so as to be centrifugally projected therefrom against the inner surface of the freezing vessel and from which the frozen material is scraped by the helical member and fed downwardly to the outlet port for discharge and use, said freezing vessel being of double wall construction with a chamber between the walls for the flow of a heat transfer vehicle and at least one of the opposed surfaces of the double wall construction being undulated to retard the flow of the heat transfer vehicle and effect quicker freezing of said material.

6. An apparatus for freezing syrups or other liquids comprising a freezing vessel the walls of which are adapted to be refrigerated to maintain a temperature below the freezing point, an interior driven rotor with which said vessel walls are concentric, a whirling scraping member on said rotor having its blades rotating in scraping relation upon said refrigerated walls, and a liquid supply passage located to infeed liquid in a gradual manner directly upon the face of a scraper blade; whereby the whirling of the blade throws the liquid continuously to the refrigerated wall for contact freezing thereon and to be scraped continuously off by the blade for delivery to a suitable receptacle.

7. An apparatus as in claim 6, and wherein in the liquid supply passage is a flow control means comprising a float chamber and float therein adapted to take a control position according to the density of the liquid to be frozen.

8. Apparatus for freezing syrups or other liquids comprising an upright freezing vessel the walls of which are adapted to be refrigerated to maintain a temperature below the freezing point, an interior driven rotor turning on an upright axis with which said vessel walls are concentric, a whirling scraping member on said rotor having a helical blade rotating in scraping relation upon said refrigerated walls, and a liquid supply passage located to infeed liquid in a gradual manner directly upon the top face of said helical blade; whereby the whirling of the blade throws the liquid continuously to the upper part of the refrigerated wall for contact freezing thereon and to be scraped from the wall continuously downwardly for delivery to a suitable receptacle below.

9. An apparatus as in claim 8 and wherein the scraping edge of the helical blade is interrupted with numerous notches or recesses which facilitate downward progress of liquid.

ALBERTO FRANCESCO GENOVA.